US007929667B1

(12) United States Patent
Zhuang et al.

(10) Patent No.: US 7,929,667 B1
(45) Date of Patent: Apr. 19, 2011

(54) HIGH BRIGHTNESS X-RAY METROLOGY

(75) Inventors: Guorong V. Zhuang, Santa Clara, CA (US); John Fielden, Los Altos, CA (US)

(73) Assignee: KLA-Tencor Corporation, Milpitas, CA (US)

( * ) Notice: Subject to any disclaimer, the term of this patent is extended or adjusted under 35 U.S.C. 154(b) by 100 days.

(21) Appl. No.: 12/569,833

(22) Filed: Sep. 29, 2009

Related U.S. Application Data

(60) Provisional application No. 61/102,281, filed on Oct. 2, 2008.

(51) Int. Cl.
*H01J 35/00* (2006.01)
*H01J 35/08* (2006.01)
*G01N 23/20* (2006.01)

(52) U.S. Cl. .......................... 378/119; 378/143; 378/70

(58) Field of Classification Search .................... 378/42, 378/44, 45, 70, 71, 119, 143
See application file for complete search history.

(56) References Cited

U.S. PATENT DOCUMENTS 6,282,263 B1 8/2001 Arndt et al.
6,512,814 B2 1/2003 Yokhin et al.
6,680,996 B2 1/2004 Yokhin et al.
6,895,076 B2 5/2005 Halsmer et al.
7,133,590 B2 11/2006 Shaw et al.
7,483,517 B2 * 1/2009 Barschdorf et al. .......... 378/119
7,642,533 B2 * 1/2010 Partio et al. ............... 250/504 R
2002/0015473 A1 * 2/2002 Hertz et al. ................... 378/143
2002/0141536 A1 * 10/2002 Richardson .................. 378/119
2003/0142789 A1 * 7/2003 Harding et al. ............... 378/119
2007/0069125 A1 3/2007 Schueler et al.

OTHER PUBLICATIONS

Butvina et al. "Single-mode microstructured optical fiber for the middle infrared," Optics Letters, vol. 32, No. 4, Feb. 15, 2007, pp. 334-336.
Kung, "As-S and As-Se based photonic band gap fiber for IR laser transmission," Optics Express, vol. 11, No. 25, Dec. 15, 2003, pp. 3455-3460.
Krause, "Atomic radiative and radiationless yields for K and L shells," J. Phys. Chem. Ref. Data, vol. 8, No. 2, 1994, pp. 307-327.
Thompson et al., "X-Ray Data Booklet," Lawrence Berkeley National Laboratory, Jan. 2001, pp. 2-1-2-16.
Otendal et al., "A 9 keV electron-impact liquid-gallium-jet x-ray source," Review of Scientific Instruments 79, 016102, 2008.

(Continued)

*Primary Examiner* — Irakli Kiknadze
(74) *Attorney, Agent, or Firm* — Luedeka, Neely & Graham, P.C.

(57) ABSTRACT

An x-ray metrology tool having only one x-ray source. The x-ray source includes a liquid metal source for heating and melting at least one metal and producing a liquid metal jet, a liquid metal collector for acquiring the liquid metal jet, a liquid metal circulation system for returning liquid metal from the liquid metal collector to the liquid metal source, and an electron beam source for directing an electron beam at the liquid metal jet anode, thereby producing an incident x-ray beam that is directable towards a sample. A detector receives emissions from the sample in response to the incident x-ray beam, and produces signals indicative of properties of the sample. A controller controls the x-ray source, acquires the signals from the detector, and determines the properties of the sample based at least in part on the signals.

18 Claims, 2 Drawing Sheets

OTHER PUBLICATIONS

Matsushita et al., "High-speed x-ray reflectometory in multiwavelength-dispersive mode," Applied Physics Letters 92, 024103, 2008.

Kneip et al., "Observation of Synchrotron Radiation from Electrons Accelerated in a Petawatt-Laser-Generated Plasma Cavity," PRL 100, 105006, 2008.

Jiang et al., "Generation of ultrashot hard-x-ray pulses with tabletop laser systems at a 2-kHz repetition rate," J. Opt. Soc. Am. B, vol. 20, No. 1, Jan. 2003. pp. 229-237.

Tuohimaa et al., "Phase-contrast xray imaging with a liquid-metal-jet-anode microfocus source," Applied Physics Letters 91, 074104, 2007.

Tengjiao et al., "Small angle x-ray scattering metrology for sidewall angle and cross section of nanometer scale line gratings," Journal of Applied Physics, vol. 96, No. 4, Aug. 15, 2004, pp. 1983-1987.

Jones et al., "Small angle x-ray scattering for sub-100 nm pattern characterization," Applied Physics Letters, vol. 83, No. 19, Nov. 10, 2003, pp. 4059-4061.

* cited by examiner

HIGH BRIGHTNESS X-RAY METROLOGY

FIELD

This application claims all rights to and priorities of U.S. provisional patent application Ser. No. 61/102,281 file 2008. Oct. 2, the entirety of the disclosure of which is incorporated herein by reference. This invention relates to the field of integrated circuits. More particularly, this invention relates to the metrology of integrated circuits.

BACKGROUND

The continuous shrinking of integrated circuits makes metrology much more difficult using ultraviolet-visible spectroscopy, because the wavelengths within this spectral range are much larger than the dimensions to be measured. As the term is used herein, "integrated circuit" includes devices such as those formed on monolithic semiconducting substrates, such as those formed of group IV materials like silicon or germanium, or group III-V compounds like gallium arsenide, or mixtures of such materials. The term includes all types of devices formed, such as memory and logic, and all designs of such devices, such as MOS and bipolar. The term also comprehends applications such as flat panel displays, solar cells, and charge coupled devices.

With wavelengths that are more comparable to the structures to be measured, x-ray metrology is an attractive alternative. However, x-ray metrology techniques such as x-ray reflectometry, small angle x-ray scattering, x-ray fluorescence, x-ray diffraction and x-ray photo-electron spectroscopy impose significant challenges for x-ray sources if they are to meet the needs of the integrated circuit industry. Most prominent among those challenges are producing a sufficiently small beam spot with a sufficiently high beam brightness (also known as radiance, which is defined as the photon flux per unit solid angle per unit source area).

If the beam spot is not small enough, then a small feature or position within the integrated circuit cannot be measured without the measurement being affected by the surrounding area and hence potentially inaccurate. If the beam is not bright enough, then the signal to noise ratio will be too low for the required measurement accuracy and repeatability, and a long measurement time would be needed. The challenge of producing a sufficiently small spot of sufficiently high brightness is greatest when grazing incidence angles are required, such as in x-ray reflectometry and small-angle x-ray scattering, as well as some x-ray diffraction and x-ray fluorescence measurements.

Currently, only synchrotron radiation sources are able to provide an x-ray beam that meets these challenges. Unfortunately, synchrotron sources are large, expensive, and not well-suited for the fabrication environment where in-line metrology is performed on integrated circuits in a production environment.

What is needed, therefore, is an integrated circuit metrology system that overcomes problems such as those described above, at least in part.

SUMMARY

The above and other needs are met by an x-ray metrology tool having an x-ray source. The x-ray source includes a liquid metal source for heating and melting at least one metal and producing a liquid metal jet, a liquid metal collector for acquiring the liquid metal jet, a liquid metal circulation system for returning liquid metal from the liquid metal collector to the liquid metal source, and an electron beam source for directing an electron beam at the liquid metal jet, thereby producing an incident x-ray beam that is directable towards a sample. A detector receives radiation from the sample in response to the incident x-ray beam, and produces signals indicative of properties of the sample. The radiation from the sample might include reflected, diffracted, or scattered x-rays from the incident beam, or it might comprise x-rays or photoelectrons emitted as a result of the incident x-rays being absorbed by the sample. A controller controls the x-ray source, acquires the signals from the detector, and determines the properties of the sample based at least in part on the signals.

The x-ray source as claimed is much brighter than conventional solid anode x-ray sources, while being at the same time much smaller than a synchrotron x-ray source, thus creating a tool that is far more useful for integrated circuit metrology. Because the x-ray beam is so bright, it can be focused down to a smaller spot size, which is required for the small features of integrated circuits, while still having a flux sufficient for a high signal to noise ratio and short measurement acquisition time.

In various embodiments the tool is configured to perform one of x-ray reflectometry, small angle x-ray scattering, critical dimension small angle x-ray scattering, grazing incident x-ray reflectometry, x-ray photoelectron spectroscopy, x-ray diffraction, total internal reflection X-ray fluorescence, and x-ray fluorescence. In some embodiments the x-ray source is operated continuously and not pulsed during signal acquisition. In some embodiments the metal and the liquid metal jet include more than one element, which in some embodiments are at least one of gallium, thallium, indium, bismuth, and tin. The x-ray beam includes photons at only one peak energy (wavelength) in some embodiment, and in other embodiments the x-ray beam includes photons at two or more peak energies (wavelengths).

In one embodiment the tool is configured to perform x-ray reflectometry, and the detector includes two separate CCD detectors in two separate sections of angular space that each produce signals simultaneously and independently, which signals are independently acquired and analyzed by the controller. In another embodiment the tool is configured to perform x-ray reflectometry, and the detector is a single CCD detector having two sections that each produce signals simultaneously and independently, which signals are independently acquired and analyzed by the controller.

In one embodiment, the metal and the liquid metal jet include more than one element, and the x-ray beam radiation concurrently having first photons at a first peak energy and a first peak wavelength and second photons at a second peak energy that is different from the first peak energy and a second peak wavelength that is different from the first peak wavelength. A grating receives the x-ray beam and directs the first photons along a first path and the second photons along a second path that is different from the first path. The first path impinges a spot on the sample at a first grazing angle, and the second path impinges the spot on the sample at a second grazing angle that is different from the first grazing angle. A first detector receives first emissions from the sample in response to the first photons and produces first signals indicative of first properties of the sample. A second detector receives second emissions from the sample in response to the second photons and produces second signals indicative of second properties of the sample. The controller acquires the first signals and the second signals, and determines the first properties and the second properties of the sample based at least in part on the first signals and the second signals.

In some embodiments the tool as described above is configured to perform both x-ray reflectometry and x-ray fluorescence. In other embodiments the tool as described above is configured to perform both x-ray reflectometry and x-ray diffraction. In yet other embodiments the tool as described above is configured to perform both x-ray diffraction and x-ray fluorescence. In some embodiments the first properties include at least one of layer thickness, density, refractive index, lattice constant, stress, and structure dimensions and the second properties include at least one of elemental identification and composition. In some embodiments the first properties include at least one of layer thickness, structure dimensions, structure shape details such as profile, and surface roughness, and the second properties include at least one of lattice constant, density, domain size, and stress.

Materials that can be measured by the x-ray metrology tool include semiconductors, metals, dielectric materials including dielectric materials with high dielectric constants (so called high-k materials) and dielectric materials with low dielectric constants (so called low-k materials), graphene, carbon nanotubes, and related materials. The high-k dielectric materials include oxides and nitrides of transition metals and rare earth elements and mixtures thereof. Low-k dielectric materials include porous materials.

BRIEF DESCRIPTION OF THE DRAWINGS

Further advantages of the invention are apparent by reference to the detailed description when considered in conjunction with the figures, which are not to scale so as to more clearly show the details, wherein like reference numbers indicate like elements throughout the several views, and wherein.

DETAILED DESCRIPTION

The various embodiments of the present invention generally fill a gap between synchrotron and conventional laboratory x-ray sources by providing an x-ray source of beams having a brightness that is comparable to that of a synchrotron, but at a physical size of the instrument that is comparable to that of a much weaker laboratory x-ray source. The availability of such an x-ray source transfers cutting-edge x-ray spectroscopy into integrated circuit nano-scale metrology tools.

Figure 1:
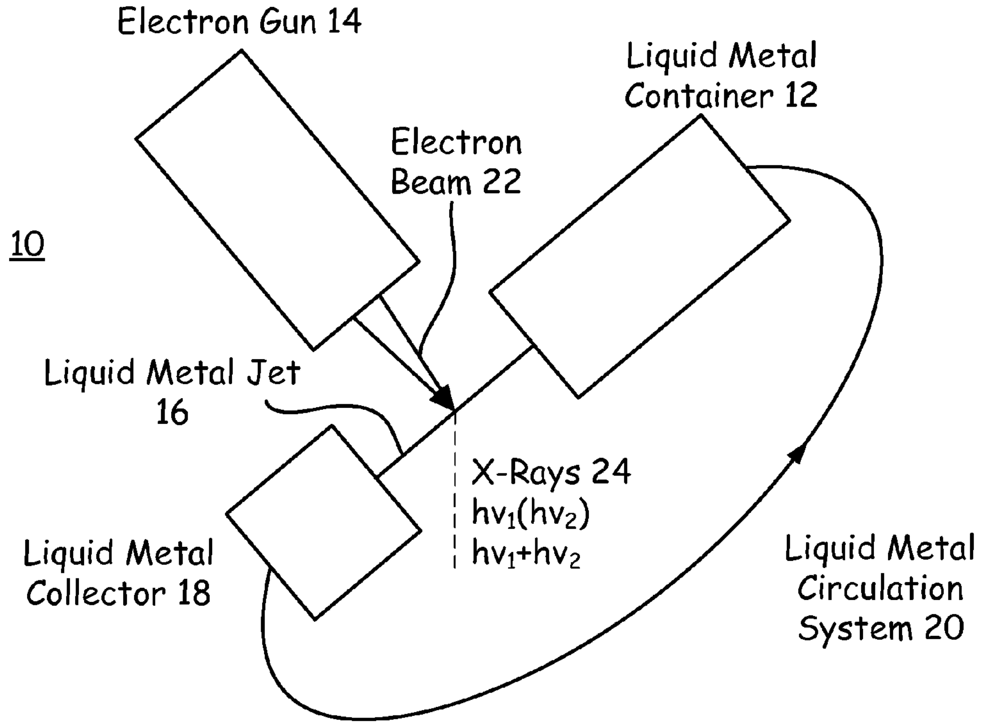
FIG. 1 depicts a liquid metal-jet x-ray source according to an embodiment of the present invention.

One embodiment of a liquid metal-jet x-ray source 10 according to the present invention is depicted in FIG. 1. The source 10 includes a liquid metal container 12 and a micro-focused electron gun 14. The liquid metal container 12 is equipped with a heating unit that provides an amount of thermal energy that is sufficient to melt a metal or combination of metals, producing a stream 16 that functions as the x-ray anode. The methods for liquefying the metal include heating by electric, electromagnetic, thermal, and microwave means. The liquid metal container 12 is also equipped with a pressurized unit to generate the liquid metal jet 16 through a nozzle. The pressure and nozzle size and shape are optimized for different metals, so as to achieve the desired x-ray source performance, as described in more detail hereafter.

A liquid metal circulation system 20 transfers the liquid metal from a liquid metal collector 18 back to the liquid metal container 12. The electron gun 14 accelerates an electron beam 22 at an appropriate angle towards the liquid metal jet 16, thereby generating an x-ray beam 24. Because heating is less of an issue with this configuration, the electron beam 22 can be continuously fired at the liquid metal jet 16, thereby producing an x-ray beam 24 that is similarly continuous, at least during the measurement time as desired. This is far preferable to pulsed operation.

The photon energy and peak wavelength of the x-ray beam 24 that is generated is governed at least in part by the materials that are selected for the liquid metal jet 16. For example, some relatively low melting-point metals are listed below in Table 1, with the x-ray photon energy that is produced and fluorescence yield by its sub-shells.

TABLE 1

X-ray liquid metal anode materials with emission line x-ray energy andthe fluorescenceyields for K, L shells.

| Element | Gallium | Indium | Tin | Thallium | Bismuth |
|---|---|---|---|---|---|
| Atomic number | 31 | 49 | 50 | 81 | 83 |
| Melting T (° C.) | 30 | 156.8 | 232.1 | 304 | 271.6 |
| $K_\alpha$ (eV) | 9251.5 | 24210 | 25271 | N/A | N/A |
| $L_\alpha$ (eV) | N/A | N/A | N/A | 10269 | 10839 |
| Fluorescence Yield $\omega_k \times 10^{-1}$ | 5.1 | 8.5 | 8.6 | N/A | N/A |
| Fluorescence Yield $\omega_L \times 10^{-1}$ | N/A | N/A | N/A | 4.6 | 4.1 |

Some embodiments of the present invention generate x-rays with photons having different energy levels and peak wavelengths, by using a mixture of two or more liquid metals as the anode. For example, by using a mixture of gallium and indium in the liquid metal anode 16, the x-ray source will simultaneously generate a beam 24 with some photons having an energy of about nine thousand electron volts due to the gallium, and some photons with an energy of about twenty-four thousand electron volts due to the indium. Further, the beam will have two distinct peak wavelengths, one attributable to the gallium and the other attributable to the indium. These peaks are superposed on a background of continuum Bremsstrahlung radiation that is always generated when high-energy electrons strike a metal target.

The balance between these photons of different energy and wavelength can be controlled, at least in part, by the ratio of liquid metals in the anode 16. A source with two metals would then produce an x-ray beam having two distinct peak lines, and not a beam with a broad range of photon energies or wavelengths. Thus, a single x-ray source can be highly tailored to two specific applications, as described in more detail below. Of course, using three metals will produce a beam with three peak lines, and can be tailored to three specific applications, and so forth. It is understood that, in some cases, a single metal is also capable of producing multiple emission lines depending on the electronic structure of the metal used for the liquid jet and the energy of the incident electron beam.

Using a liquid metal x-ray source, it is possible to create a spot with a brightness that is at least two to four orders of magnitude greater than what is currently available from a solid metal anode x-ray tube. For example, a liquid gallium x-ray source has a brightness in the range of about $10^{13\text{-}14}$ photons $sec^{-1}$ $mm^{-2}$ $mrad^{-2}$, as opposed to a brightness upper limit of about $10^{11}$ photons $sec^{-1}$ $mm^{-2}$ $mrad^{-2}$ for solid anodes of copper or molybdenum. With such a significant brightness gain, the x-ray spot size can be from about ten microns to about fifteen microns in diameter with a higher signal to noise ratio than that of currently available sources, or have an even smaller spot size with a signal to noise ratio that is still better than or equal to current sources.

In some embodiments the x-ray beam 24 is further conditioned using various x-ray optics, such as a zone plate, multilayer x-ray focusing elements, a collimator, a pinhole, and a monochrometer, to produce a collimated or focused beam of suitable size and shape for various x-ray integrated circuit metrology techniques, the basic configurations and operation of which are well-known in the art. These spectroscopy techniques include but are not limited to x-ray reflectometry (XRR), small angle x-ray scattering (SAXS), critical dimension small angle x-ray scattering (CD-SAXS), grazing incident x-ray reflectometry (GXR), x-ray photoelectron spectroscopy (XPS), x-ray diffraction (XRD), total reflection X-ray fluorescence (TXRF), and x-ray fluorescence (XRF). Various embodiments of the present invention apply the liquid metal x-ray source to these basic techniques.

Figure 2:
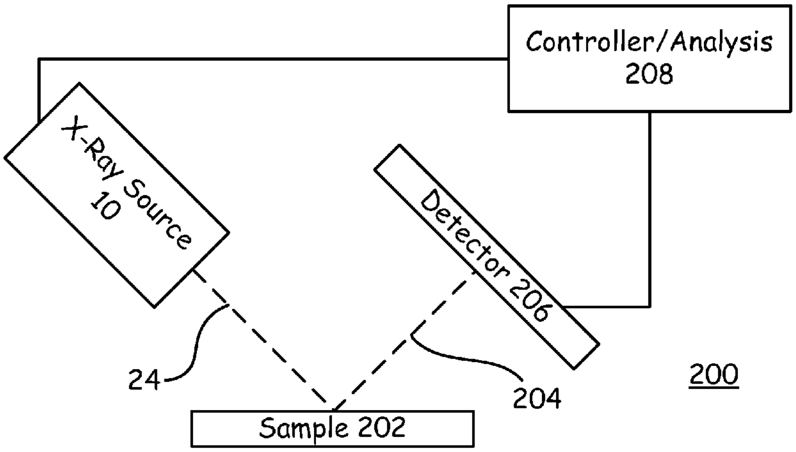
FIG. 2 depicts a spectroscopy system according to an embodiment of the present invention.

In their most basic forms, the tools that implement these spectroscopy techniques have similar basic structures, as depicted in FIG. 2. The tool 200 as depicted has an x-ray source, which in the present embodiments is a liquid metal jet x-ray source 10, as described above. In some embodiments the x-ray source 10 produces a beam of x-rays 24 that impinge upon a sample 202, creating a reflected, diffracted or scattered beam 204. In other embodiments, the beam of x-ray 24 that impinges upon the sample 202 causes x-rays or photoelectrons to be emitted from the sample, also indicated by beam 204 in FIG. 2. Properties of the reflected or emitted beam 204 are sensed by a detector 206. A controller/analysis unit 208 directs the operation of the tool 200, and interprets the signals that are generated by the detector 206.

Various optical components and other subsystems as known in the art are added to this basic configuration to create the specific tools mentioned in the paragraph above. For example, the x-ray beam 24 is projected at the sample 202 at different angles, different spot sizes, different intensities, different wavelengths, and so forth. Certain ones of these techniques measure parameters such as material thickness, interface roughness between material layers, features-width and height, stress, lattice constant, crystallinity and so forth. Others of these techniques perform quantitative and qualitative elemental analysis, as well as measure material composition parameters such as stoichiometry and chemical bonding states. Additional modifications to this basic structure according to the present invention are described below.

X-Ray Reflectometry (XRR)

With the brightness levels as described above, the dynamic range of the detector in an XRR metrology system using a liquid metal anode becomes more of a limiting factor for metrology sensitivity and throughput than the x-ray source. In prior art devices, two knife edges are used to divert the x-ray beam and generate the required dynamic range. Embodiments according to the present invention combine the high brightness liquid metal anode x-ray source and a computer controlled detector readout to achieve a six to eight decade dynamic range, all without resorting to mechanical moving parts, such as a shutter or a knife edge.

In one embodiment, two sections of a CCD detector 206 are used to cover the XRR angular region required for the desired dynamic range. These two detectors 206 acquire the data in two sections of angular space simultaneously, with a desired acquisition time to achieve the desired signal to noise ratio over the whole dynamic range.

In another embodiment a single CCD detector 206 is used to cover the XRR angular region required for the desired dynamic range. The data acquisition is simultaneously gathered from the detector 206, but the signals from different sections of the detector 206 are separately analyzed with desired optimization schemes, to achieve the desired signal to noise ratio over the whole dynamic range.

Embodiments such as these enhance the capability of an XRR metrology system with high-K dielectrics, such as $Ta_2O_5/SiO_2/Si$, $Si_3N_4/SiO_2/Si$, $HfO_2/SiO_2/Si$, $ZrO_2/SiO_2/Si$, $BaSrTiO_3/SiO_2/Si$, and $Al_2O_3/SiO_2/Si$, as well as multilayer film stacks with three, four or more layers of two, or more, materials such as $ZrO_2/Al_2O_3/ZrO_2/Si$ and $[HfO_2/Al_2O_3]_{n=4}/Si$. Since liquid gallium anode Kα sources have a shorter wavelength (1.34 Å) than the currently-used solid copper anode Kα sources (1.54 Å) commonly used in XRR metrology systems, the interference fringes are closer together in angular range and therefore giving a more accurate result for very thin layers. Furthermore, the shorter wavelength is more sensitive to thin film thickness and multilayer stack variations, as well as to interface and surface roughness.

Critical Dimension Small Angle X-Ray Scattering (CD-SAXS)

CD-SAXS has been shown to have the potential to measure critical dimensions, side-wall angle, line-edge roughness, and line-width roughness in a straight-forward and non-destructive manner. Critical dimension measurements may be accomplished using a transmission measurement configuration, instead of a reflection configuration. In a transmission configuration, the detector 206 is placed beneath the sample 202, on the opposite side from the source 10. For x-rays penetrating through silicon, x-ray photon energy in excess of about thirteen thousand electron volts is required. Fortunately, x-rays at these energy levels do relatively little damage to the materials because of the weak interaction of the x-rays with the silicon.

In the past, such measurements could only be conducted where a bright, high-energy synchrotron light source was available. In one embodiment according to the present invention, an indium or tin liquid-metal-jet x-ray source 10 as disclosed herein serves as an x-ray source that has suitable energy and brightness, comparable to that of a synchrotron ($10^{13-15}$ photons $sec^{-1}$ $mm^{-2}$ $mrad^{-2}$), thus enabling the use of CD-SAXS for production measurements of critical dimensions in the integrated circuit industry.

X-Ray Photoemission Spectroscopy (XPS)

A gallium liquid x-ray source as described herein is approximately four orders of magnitude brighter than the solid metal copper, magnesium or aluminum anodes typically used in a conventional x-ray tube, and more than compensates for the lower photo-ionization cross section of the atoms in the measurement target. The high flux of the liquid metal x-ray source generally lowers the photo-ionization cross-section as the x-ray source excitation energy increases. The benefits of the higher x-ray source excitation energy include increased probing depth due to longer inelastic mean-free path of the photoelectrons. Therefore, embodiments according to this aspect of the invention: (a) extend the capability of XPS to thicker film stacks than is possible with solid metal magnesium and aluminum x-ray sources, (b) make measurement precision less susceptible to surface contamination, and (c) shrink the current metrology spot size from about fifty microns square to about twenty microns square, with better signal to noise ratio. All of these factors are of critical importance in meeting the inline requirements for integrated circuit metrology.

X-Ray Fluorescence Spectroscopy (XRF)

Indium or tin liquid metal anode sources are used in some embodiments for heavy element detection, while gallium liquid metal anode sources are used in other embodiments for light element detection. If Bremsstrahlung production is neglected, which is largely valid for the photon excitation energies described herein, the mass attenuation coefficient $\mu/\rho$ ($cm^2/g$) and the mass energy-absorption coefficient $\mu_{en}/\rho$($cm^2/g$) are very close. For compounds and mixtures, values for ($\mu/\rho$) can be obtained by simple additivity, such as by combining values for the elements according to their proportions by weight. For example:

$$\left(\frac{\mu}{\rho}\right)_{SiO2} = \frac{\mathrm{MW}(Si)}{\mathrm{MW}(SiO_2)}\left(\frac{\mu}{\rho}\right)_{Si} + \frac{\mathrm{MW}(O_2)}{\mathrm{MW}(SiO_2)}\left(\frac{\mu}{\rho}\right)_{O},$$

where MW is the molecular weight of the element or compounds and $\mu'$=/$\mu\rho$ is the mass attenuation coefficient, and $$I_{Si}^{bulk} \propto I_0 \cdot \sigma \cdot FY(Si_{K\alpha}) \cdot \eta \int_0^{\infty} \exp\{[-\mu'_{Si}(E_{ex}) - \mu'_{Si}(E_{FL})]\rho_{Si} t\}\, dt,$$
$$\propto I_0 \cdot \sigma \cdot FY(Si_{K\alpha}) \cdot \eta \frac{1}{\rho_{Si}} \cdot [\mu'_{Si}(E_{ex}) + \mu'_{Si}(E_{Fl})]^{-1},$$

where $I_0$ is the excitation x-ray flux, $\sigma$ is inner shell photo-ionization cross-section (in this case the silicon 1s shell), FY is the fluorescence yield efficiency, $\eta$ is the system detection efficiency, $\mu_{Si}$ ($E_{ex}$) and $\mu_{Si}$ ($E_{fl}$) are the mass attenuation coefficients at excitation x-ray energy and fluorescence x-ray energy, respectively.

For determining the P signal in a boron-phospho-silicate glass film:

$$I_P \propto I_0 \cdot \sigma(P1s) \cdot FY(P_{K\alpha}) \cdot \eta \int_0^{t} \exp - \left[(\mu_P(E_{ex}) + \mu_P(E_{Fl}))t\rho_{SiO2}\, dt,\right.$$
$$\propto I_0 \cdot \sigma(P1s) \cdot FY(P_{K\alpha}) \cdot \eta \frac{1}{\rho_{SiO2}} \cdot \left[\frac{1}{\mu_{PSG}(E_{ex}) + \mu_{PSG}(E_{P(k\alpha)})}\right] \cdot$$
$$\{1 - \exp[-(\mu_{PSG}(E_{ex}) + \mu_{PSG}(E_{P(K\alpha)}))\rho^{t}_{PSG}]\}$$

Where the fluorescence signal is dominated by: (1) the fluorescence generation threshold of the material to be probed and the probe x-ray source energy; and (2) $\mu'(E_{Fl})$, $\mu'(E_{ex})$ of the x-ray source. However, for the materials of present interested, the fluorescence signal that attains the detector is mostly dependant on $\mu'(E_{Fl})$ rather than on $\mu'(E_{ex})$ $\mu'(E_{Fl}) \ll \mu'(E_{ex})$. In the present embodiments, the photo-ionization cross section is very sensitive to the x-ray excitation energy. Decreasing the excitation energy will increase the cross section by one or two orders of magnitude. Based on the formula given above, it is possible to measure the elemental composition of the film.

In one embodiment a gallium liquid metal source 10 is used for detecting light elements using an XRF metrology system, by taking advantage of both the high brightness of the source and the high photo-ionization cross-section. The liquid gallium anode source is very suitable for light element detection (B, N, O, Al, Si, P, Cu) in comparison to a molybdenum anode. Indium and tin liquid anode sources can be used for these and heavier elements such as hafnium, tantalum, and titanium by taking advantage of the high brightness of the liquid metal source.

XRR-XRF Combination

Because the liquid metal stream 16 can be formed of more than one material, the x-ray source 10 can simultaneously generate x-rays 24 with photons of two different energies, and thus can be used in a tool that can perform more than one x-ray metrology technique, including combinations of techniques such as XRR-XRF (TXRF), XRR-XPS, and XRF-XPS. In this exemplary list, the first technique is used to determine film thickness and the second technique is used for element and concentration measurements. These different types of techniques require x-rays with different energy levels or wavelengths, and more particularly not with a broadband spectrum, but with distinct energy or wavelength peak lines in the ranges as desired. Since prior art x-ray sources do not produce such x-rays, such combinational tools were not previously possible.

Figure 3:
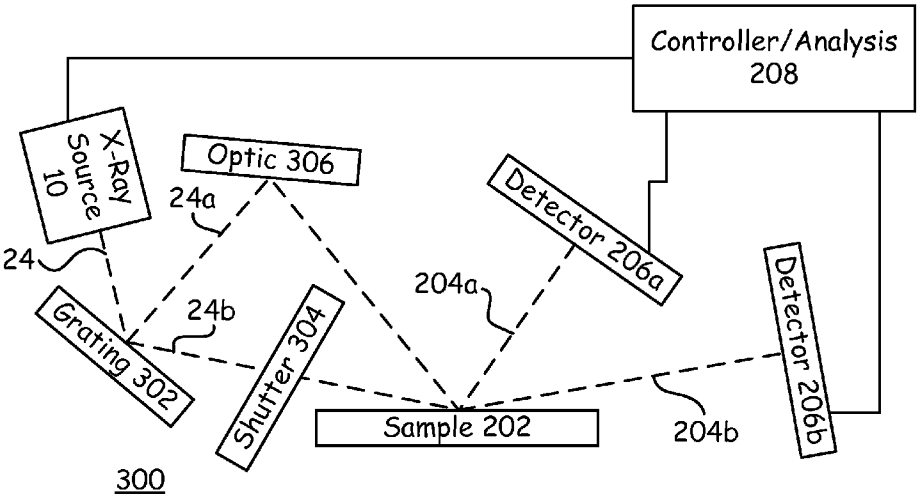
FIG. 3 depicts a combination metrology system according to an embodiment of the present invention.

With reference now to FIG. 3, there is depicted an embodiment of the present invention that utilizes the liquid metal x-ray source 10 in an XRR-XRF combination metrology tool 300. The x-ray source 10 of this embodiment concurrently generates x-rays 24 with photon energies of both $h\nu_1$ and $h\nu_2$. The former energy photons are selected for XRR and the latter energy photons are selected for XRF. A Bragg diffraction grating 302 directs $h\nu_1$ photons 24*b* along a glazing angle as required for XRR, while diffracting $h\nu_2$ photons 24*a* at another angle towards a multilayer optic or monochromatic focusing optic 306 for XRF. The monochromatic focusing optic 306 in the XRF beam 24*a* path focuses the $h\nu_2$ photons onto a common measurement site of the sample 202 with the XRR photons 24*b*. A removable shutter 304 in the XRR beam path 24*b* ensures that no florescence signal induced by the $h\nu_1$ photons 24*b* will confound the XRF measurement results, as sensed by the XRF detector 206*a*. The XRR detector 206*b* senses the signal created by the $h\nu_1$ photons 24*b*. Thus, XRR and XRF are measured concurrently on a single site without any moving optical parts besides the shutter.

The foregoing description of preferred embodiments for this invention has been presented for purposes of illustration and description. It is not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. An x-ray metrology tool comprising:

only one x-ray source, comprising, a liquid metal source for heating and melting at least one metal and producing a liquid metal jet, a liquid metal collector for acquiring the liquid metal jet, a liquid metal circulation system for returning liquid metal from the liquid metal collector to the liquid metal source, and an electron beam source for directing an electron beam at the liquid metal jet, thereby producing an incident x-ray beam that is directable towards a sample, a detector for receiving emissions from the sample in response to the incident x-ray beam and producing signals indicative of properties of the sample, and a controller for controlling the x-ray source, acquiring the signals from the detector, and determining the properties of the sample based at least in part on the signals.

2. The x-ray metrology tool of claim 1, wherein the tool is configured to perform one of x-ray reflectometry, small angle x-ray scattering, critical dimension small angle x-ray scattering, grazing incident x-ray reflectometry, x-ray photoelectron spectroscopy, x-ray diffraction, total reflection x-ray fluorescence, and x-ray fluorescence.

3. The x-ray metrology tool of claim 1, wherein the x-ray source is operated continuously and not pulsed during signal acquisition.

4. The x-ray metrology tool of claim 1, wherein the metal and the liquid metal jet comprises more than one element.

5. The x-ray metrology tool of claim 1, wherein the metal and the liquid metal jet comprise at least one of gallium, thallium, indium, bismuth, and tin.

6. The x-ray metrology tool of claim 1, wherein the x-ray beam comprises photons at only one peak energy and wavelength.

7. The x-ray metrology tool of claim 1, wherein the x-ray beam comprises photons at only two peak energies and wavelengths.

8. The x-ray metrology tool of claim 1, wherein the x-ray beam comprises photons at more than two peak energies and wavelengths.

9. The x-ray metrology tool of claim 1, wherein:

the tool is configured to perform x-ray reflectometry, and the detector comprises two separate CCD detectors in two separate sections of angular space that each produce signals simultaneously and independently, which signals are independently acquired and analyzed by the controller.

10. The x-ray metrology tool of claim 1, wherein:

the tool is configured to perform x-ray reflectometry, and the detector comprises a single CCD detector having two sections that each produce signals simultaneously and independently, which signals are independently acquired and analyzed by the controller.

11. The x-ray metrology tool of claim 1, further comprising:

the metal and the liquid metal jet comprise more than one element, the x-ray beam comprises non-Bremsstrahlung radiation concurrently having first photons at a first peak energy and a first peak wavelength and second photons at a second peak energy that is different from the first peak energy and a second peak wavelength that is different from the first peak energy, a grating for receiving the x-ray beam and directing the first photons along a first path and the second photons along a second path that is different from the first path, where the first path impinges a spot on the sample at a first grazing angle, where the second path impinges the spot on the sample at a second grazing angle that is different from the first grazing angle, the detector comprises a first detector and a separate second detector, the first detector for receiving first emissions from the sample in response to the first photons and producing first signals indicative of first properties of the sample, the second detector for receiving second emissions from the sample in response to the second photons and producing second signals indicative of second properties of the sample, the controller for acquiring the first signals and the second signals, and determining the first properties and the second properties of the sample based at least in part on the first signals and the second signals.

12. The x-ray metrology tool of claim 11, wherein the tool is configured to perform both x-ray reflectometry and x-ray fluorescence.

13. The x-ray metrology tool of claim 11, wherein the first properties comprise at least one of layer thickness and structure size and the second properties comprise at least one of elemental identification and composition.

14. The x-ray metrology tool of claim 11, wherein the x-ray source is operated continuously and not pulsed during signal acquisition.

15. A combined x-ray reflectometry and x-ray fluorescence metrology tool comprising:

only one x-ray source, comprising, a liquid metal source for heating and melting two metals and producing a liquid metal jet, a liquid metal collector for acquiring the liquid metal jet, a liquid metal circulation system for returning liquid metal from the liquid metal collector to the liquid metal source, and an electron beam source for directing an electron beam at the liquid metal jet, thereby producing an incident x-ray beam that is directable towards a sample, the x-ray beam comprising non-Bremsstrahlung radiation concurrently having first photons at a first peak energy and a first peak wavelength and second photons at a second peak energy that is different from the first peak energy and a second peak wavelength that is different from the first peak energy, a grating for receiving the x-ray beam and directing the first photons along a first path and the second photons along a second path that is different from the first path, where the first path impinges a spot on the sample at a first grazing angle, where the second path impinges the spot on the sample at a second grazing angle that is different from the first grazing angle, a first detector for receiving first emissions from the sample in response to the first photons and producing first signals indicative of first properties of the sample, a second detector that is different from the first detector for receiving second emissions from the sample in response to the second photons and producing second signals indicative of second properties of the sample, and a controller for controlling the x-ray source, acquiring the first signals from the first detector, acquiring the second signals from the second detector, and determining the properties of the sample based at least in part on the first signals and the second signals.

16. The x-ray metrology tool of claim 15, wherein the first properties comprise at least one of layer thickness and structure size and the second properties comprise at least one of elemental identification and composition.

17. The x-ray metrology tool of claim 15, wherein the x-ray source is operated continuously and not pulsed during signal acquisition.

18. The x-ray metrology tool of claim 15, wherein the metal and the liquid metal jet comprise gallium and indium.

* * * * *